Patented Feb. 26, 1952

2,587,295

UNITED STATES PATENT OFFICE 2,587,295

ALKYD-POLYSILOXANE RESINS

Charles D. Doyle and Henry C. Nelson, Jr., Schenectady, N. Y., assignors to General Electric Company, a corporation of New York No Drawing. Application November 22, 1947, Serial No. 787,624

9 Claims. (Cl. 260—22)

This invention relates to new and improved synthetic resins. More particularly, the invention is concerned with oil-modified alkyd resins modified by organopolysiloxanes, and methods of preparing the same.

Rochow Patents 2,258,218–222, issued October 7, 1941, and assigned to the same assignee as the present invention, disclose and teach that organopolysiloxanes may be incorporated into modified and unmodified alkyd resins to alter the properties of the latter. However, it has been found that a mere mixing (with or without heating) of the aforementioned oil-modified alkyd resins and organopolysiloxanes results in an incompatibility between the two resins as evidenced by the separation of the resins when the mixture thereof is employed for coating purposes.

It has also been suggested in British Patent 583,754 that organic silicols may be employed to modify the properties of alkyd resins by heat-reacting the two resinous ingredients. Although such heat-reacted mixtures of resins are seemingly compatible, they, nevertheless, on curing or drying, show indications of incompatibility of the individual components as evidenced by the presence of small craters on the surface of such resins. In the case of methyl silicols, because of the rapidity with which condensation takes place, it is virtually impossible to obtain compatible products with oil-modified alkyd resins.

We have now discovered that compatible, heat-resistant, light-resistant, and chemical-resistant oil-modified-organopolysiloxane resinous compositions can be prepared by employing for interaction, under heat, an oil-modified alkyd resin containing free hydroxyl (—OH) groups and an organopolysiloxane containing silicon-bonded alkoxy radicals, e. g., alkoxy radicals represented by the general formula RO—, where R is an alkyl radical, (either primary, secondary, or tertiary), e. g., methyl, ethyl, buthyl, isopropyl, isobutyl, secondary butyl, tertiary butyl, amyl, hexyl, etc. We prefer to use organopolysiloxanes wherein R is a primary lower alkyl radical containing from 3 to 6 carbon atoms.

The means whereby we are able to obtain truly compatible mixtures of the foregoing oil-modified alkyd resin containing free or residual hydroxy groups (for brevity this resin will hereinafter be referred to as an "alkyd resin") and the organopolysiloxane containing silicon-bonded alkoxy radicals is not clearly understood. However, it is believed that the presence of the silicon-bonded alkoxy radicals gives a functionality to the organopolysiloxane which is specific for reaction with the free hydroxy groups of the alkyd resin. In contrast to this, the hydroxy groups in the organic silicols are not specific to the free OH groups of the alkyd resin, since the silicon-bonded OH groups of the organic silicol may, and usually do, intercondense among themselves more readily to yield siloxane linkages, thus depriving the free OH groups on the alkyd resin from interacting with the hydroxyl groups of the organic silicols.

The polysiloxanes employed in the practice of our invention have the further advantage that by controlling the number or amount of alkoxy radicals bonded to silicon atoms, it is possible to tailor the polysiloxane so as to yield one having any desired residual functionality to match a controlled number of free hydroxy groups in the oil-modified alkyd resin. This permits the preparation of organopolysiloxane - modified alkyd resins having any desired, predictable property. Such control cannot be obtained when using organic silicols as suggested by the aforementioned British patent.

The type or kind of organopolysiloxane (i. e., alkoxy-bearing organopolysiloxane) employed in the practice of this invention may be varied within wide limits. For example, they may constitute any of the various organopolysiloxanes now well known and described in the art as are, for instance, more particularly disclosed and claimed in the aforementioned Rochow patents, whereby there are present in the organopolysiloxane silicon-bonded alkoxy radicals. Among such organopolysiloxanes containing silicon-bonded alkoxy radicals may be mentioned the alkyl polysiloxanes, e. g., methyl, ethyl, propyl, isopropyl, butyl, etc., alkoxypolysiloxanes, or mixtures thereof; the aryl polysiloxanes, e. g., phenyl, naphthyl, etc., alkoxypolysiloxanes; the alkaryl polysiloxanes, e. g., tolyl, xylyl, etc., alkoxypolysiloxanes, aralkyl polysiloxanes, e. g., benzyl, phenylethyl, etc., alkoxypolysiloxanes; mixed alkyl and aryl polysiloxanes, e. g., methyl phenyl, ethyl phenyl, etc., alkoxypolysiloxanes; cycloaliphatic polysiloxanes, e. g., cyclohexyl alkoxypolysiloxanes; unsaturated aliphatic polysiloxanes, e. g., vinyl, allyl, etc., alkoxypolysiloxanes. Organopolysiloxanes containing substituted groups or atoms on the organic groups, e. g., halogens, etc., are also within the scope of this invention.

We may employ lower molecular weight organopolysiloxanes containing silicon-bonded alkoxy groups, e. g., dibutoxy tetramethyldisiloxane, dipropoxy tetramethylcyclotrisiloxane, dibutoxy tetraphenyldisiloxane, etc. We have advantageously employed organopolysiloxanes containing silicon-bonded alkoxy radicals wherein the organopolysiloxane contains an average of from 0.1 to 2.5, preferably from 1 to 2 organic, e. g., hydrocarbon, groups per silicon atom, the organic groups being attached to the silicon by C—Si linkages.

The manner whereby the desired organopolysiloxanes containing silicon-bonded alkoxy radicals can be prepared may be varied in accordance with several techniques. We prefer to prepare these organopolysiloxanes (containing silicon-bonded alkoxy radicals) by starting with an organoalkoxysilane which may be prepared, for example, by adding the particular organohalogenosilane to at least a stoichiometric amount of a primary alcohol to convert all the halogens to alkoxy groups. In this way we may prepare organoalkoxysilanes, such as, for example, methyltripropoxysilane, methyl tributoxysilane, dimethyldibutoxysilane, tri-isopropyl propoxysilane, diethyl dihexoxysilane, phenyltributoxysilane, diphenyldibutoxysilane, methylphenyldipentoxysilane, etc. It will, of course, be apparent to those skilled in the art that other organoalkoxysilanes may be prepared from organosilanes containing radicals reactable with the alcohol to yield the desired organoalkoxysilanes, applying the various methods now well known in the art.

In order to prepare the organopolysiloxane containing silicon-bonded alkoxy radicals from the organoalkoxysilane, we have found it advantageous to heat the organo-alkoxysilane in the presence of a small amount (e. g., from 0.1 to 6 per cent, by weight, based on the weight of the organoalkoxysilane) of an acid catalyst, for example, glacial acetic acid, etc., with an amount of water insufficient to remove all the alkoxy radicals, yet sufficient to cause the formation of siloxane linkages to give an organopolysiloxane having the desired number of silicon-bonded alkoxy radicals.

Another method for making the organoalkoxypolysiloxane comprises simultaneously hydrolyzing and alcoholizing an organohalogenosilane with a sufficient amount of an alcohol and water to effect complete removal of the halogen but an insufficient amount of water to effect complete hydrolysis. This results in a polysiloxane having the desired number of Si—O—Si and —Si—OR linkages where R is an alkyl radical.

Although the number of silicon-bonded alkoxy radicals per silicon atom may be varied within wide limits depending upon the properties desired in the heat-reacted resinous product, good results have been obtained when there are present an average of from about 0.04 to 2.0, preferably from 0.1 to 1, alkoxy radicals per silicon atom of the organopolysiloxane. Stated in another manner, organoalkoxypolysiloxanes are advantageously employed wherein the alkoxy content of the organopolysiloxane may be varied from 2 to 95 per cent, preferably from 5 to 50 per cent, of the theoretically possible number of alkoxy radicals per silicon atom in the organopolysiloxane.

By the term "oil-modified alkyd resin" as used herein, we mean the resinous condensation product resulting from the reaction of one or more polyhydric alcohols with a polycarboxylic acid, and one or more of the oily modifying ingredients usually employed in the preparation of oil-modified alkyd resins. These modifying ingredients may be, for example, non-drying oils, semi-drying oils, drying oils, fatty oils, fatty oil acids, etc., derived either from vegetable or animal sources, or produced synthetically, etc.

Examples of poylcarboxylic acid which may be employed in the preparation of the oil-modified alkyd are oxalic, malonic, succinic, glutaric, adipic, tricarballylic; phthalic acids, for example, phthalic, isophthalic and terphthalic acids; halogenated phthalic acids, for example, tetracholorophthalic acid, 4-chlorophthalic acid, etc. The anhydrides of these materials when obtainable may be also used.

Example sof polyhydric alcohols (dihydric, trihydric, etc.) which may be employed in the practice of this invention are, for example, ethylene glycol, diethylene glycol, propylene glycol, trimethylene glycol, glycerine, trimethylol propane, pentaerythritol, polyallyl alcohol, sorbitol, mannitol, etc. We prefer to use polyhydric alcohols containing at least three or more active hydroxy groups.

Among the modifying oils (in the raw, heated or blown state) which may be used in the preparation of the oil-modified alkyd resin are linseed oil, rapeseed, cotton seed, China-wood oil, castor oil (including raw castor oil), dehydrated castor oil, soya bean oil, perilla oil, oiticica oil, linseed oil acids, coconut oil fatty acids, ricinoleic acid (including dehydroxylated ricinoleic oil acids), fatty acid glycerides, e. g., the glycerides of linoleic and linolenic acids, palmitic acid, oleic acid, stearic acid, babassu oil, palm oil, fish oils and fish oil acids as clupanodonic, and fatty oil acids derived therefrom, etc.

The amount of modifying oil or ingredient may be varied within wide limits and may be present, for example, in an amount equal to from about 5 to 80 per cent, preferably from 10 to 60 per cent, by weight, of the total weight of the modifying oil, the polyhydric alcohol and the polybasic acid or acids (or anhydride if it is used) present in the reaction mixture employed in making the oil-modified alkyd resin. However, we do not intend to be limited to the particular per cents, by weight, of the modifying ingredients disclosed above.

In carrying the invention into effect, an oil-modifying alkyd resin containing free or residual OH groups is first prepared in accordance with techniques now well known in the alkyd resin art. For example, this may comprise heating a mixture containing the polyhydric alcohol, polycarboxylic acid or anhydride and the modifying oil or ingredient at an elevated temperature of the order of from 150° to 250° C. for from about 1 to 12 hours or even longer until the desired acid number of the reaction mass is obtained. The acid number of the finally reacted mass is preferably below 50, optimum results being obtained when the acid number is below 10 or 20.

Since it is desired that the oil-modified alkyd resin contain free OH groups (i. e., residual unesterified OH groups of the polyhydric alcohol), it will be apparent to those skilled in the art that the polyhydric alcohol be in a molar excess of all the acid, e. g., carboxy, groups capable of esterifying the hydroxyl groups on the polyhydric alcohol, taking into account the presence of any acid groups which may be present in the modifying oil or acid.

The relative ratio of residual hydroxy groups in the alkyd resin to the number of alkoxy groups found in the organopolysiloxane may be varied within wide limits. However, we prefer that the hydroxy groups be present in an amount equal to at least the number of silicon-bonded alkoxy groups present in the organopolysiloxane. A slight excess of hydroxy groups is in many cases advantageous for imparting more complete utilization of the alkoxy radicals.

In order that those skilled in the art may better understand how the present invention may be practiced, the following examples are given by way of illustration and not by way of limitation. All parts are by weight.

Example 1

An alkyd resin containing free hydroxy groups was prepared as follows:

|  | Parts | Approximate Molar Ratio |
|---|---|---|
| Glycerine | 154 | 1.34 |
| Phthalic Anydride | 174 | 1.00 |
| Coconut Oil Acids (molecular weight 217) | 175 | 0.67 |
| Xylene | 50 |  |

The above ingredients were heated at about 180° to 205° C. for approximately 1 hour in a vessel equipped with a device for azeotropic distillation of the water, separation of the water, and return of the xylene to the reaction vessel. After about 35 parts water had been removed, there was added to the resinous product about 700 parts of a 78.5 percent solids xylene solution of a butoxy bearing phenyl polysiloxane prepared as follows:

About 1535 parts phenyl tri-n-butoxysilane was hydrolyzed in 140 parts of water in the presence of 5 percent, by weight, glacial acetic acid, based on the weight of the aforementioned phenyl silane. The reactants were stirred and heated under reflux conditions for 2 hours, and then the reaction mass was distilled up to a temperature of about 180° C. to remove all boiling materials. The residue which was a resinous phenyl polysiloxane was calculated to contain a ratio of about 1 butoxy radical per 4 silicon atoms. This phenyl polysiloxane was dissolved in xylene to make a 78.5 per cent solids solution.

The above xylene mixture of alkyd resin and phenyl polysiloxane containing silicon-bonded butoxy radicals was heated under reflux conditions at a temperature of about 150° to 210° C. for about 3 hours and an additional amount of 6 parts water, 13 parts n-butanol, and a small amount of xylene were removed. This resinous solution was diluted with additional xylene to yield a 71.5 per cent solids solution which cured in about 15 seconds on a 200° C. hot plate and had an acid value of about 9.8 (in mgms. KOH).

Example 2

In this example an oil-modified alkyd resin was prepared as follows:

|  | Parts | Approximate Molar Ratio |
|---|---|---|
| Pentaerythritol | 160.5 | 1.0 |
| Phthalic anhydride | 174 | 1.0 |
| Coconut oil fatty acids | 175 | 0.8 |
| Xylol | 50 |  |

The above mixture was heated at reflux temperature of about 180° to 210° C. for about 2½ hours in the same apparatus as employed in making the oil-modified alkyd resin in Example 1. This time about 34.5 parts water were collected. Thereafter 700 parts of a 66.5 per cent xylene solution of a phenyl polysiloxane containing butoxy radicals prepared in accordance with the directions disclosed above in Example 1 was added to the oil-modified alkyd resin and the mixture again heated under reflux conditions for approximately 2 hours at about 150° to 165° C. while at the same time removing the water, and butanol formed. At the end of this time, since some of the xylol had been removed by the azeotropic distillation, sufficient additional xylene was added to adjust the solids content of the reaction product to about 63 per cent solids. This resinous solution cured in approximately 12.5 seconds on a 200° C. hot plate and had an acid value of about 7.6 (in mgms. KOH).

Example 3

In order to test the resinous products prepared in Examples 1 and 2, each of the resins was made into the form of an enamel having the following typical formula:

|  | Parts |
|---|---|
| Alkyd-polysiloxane (60% solids) | 280 |
| TiO$_2$ | 310 |
| Xylene | 20 |

The above mixture was ground on a pebble mill for 48 hours until a homogeneous pigmented coating composition was obtained.

Each of the enamels prepared above was applied in a thin coat to a metal surface and baked at 200° C. for about 1½ hours. The coated surfaces in both cases were highly resistant to attack by a 3% HCl solution and a 3% NaOH solution. In addition, they exhibited good resistance to hot mineral oil and oleic acid. In contrast to this, alkyd-melamine resinous films failed completely when subjected to hot oleic acid for any considerable period of time. The shock and bend resistance characteristics of the foregoing two coating films was good. Testing of the surface of the alkyd-polysiloxane resinous coatings showed that the coating using the resinous product of Example 1 had a hardness 43 per cent of that of glass, and the resinous product obtained in Example 2 had a hardness 48 per cent of that of glass.

Example 4

In this example, 730 parts methyltrichlorosilane and 270 parts dimethyldichlorosilane were added slowly to 1485 parts n-butanol while stirring under a reflux condenser vented to a HCl absorber. The mixture was refluxed for about 2½ hours to a constant vapor temperature, and thereafter distilled until a temperature of 180° C. was reached to strip off the excess butanol and low boiling materials. The residue was cooled to about 90° C. and treated with 23.4 parts glacial acetic acid and 145.8 parts water and the total mass refluxed again for about ¾ hour to a constant vapor temperature. Thereafter, all the volatile material boiling below 180° C. (pot temperature or temperature of the reacting mass) was removed by distillation to leave a resinous residue which on analysis was shown to comprise a polymeric methyl polysiloxane containing silicon-bonded butoxy groups and having the following formula $[(CH_3)_{1.3}Si(OC_4H_9)_{0.27}O_{1.215}]_x$ where $x$ is an integer greater than 1.

An oil-modified alkyd resin containing residual hydroxy groups was prepared using the same procedure as outlined in Example 1, but employed 147 parts glycerine, 148 parts phthalic anhydride, and 167 parts coconut oil acids together with a small amount of xylene for the azeotropic distillation of the formed water. To the said oil-modified alkyd resin was added 512 parts of the above-identified methyl polysiloxane containing silicon-bonded butoxy groups, and the mixture heated together with additional xylene at its reflux temperature at from 145° to 200° C. for about 10 hours, while at the same time removing n-butanol. The heating and removal of the aforementioned alcohol were conducted until the cure of the resin was about 10 seconds when tested on a 200° C. hot plate. In this case, about 22.9 parts n-butanol for each 100 parts of the methyl butoxypolysiloxane resin were obtained from the reaction of the said polysiloxane with the oil-modified alkyd resin.

*Example 5*

In this example a methyl polysiloxane resin containing silicon-bonded butoxy groups was prepared in such a manner that the formula of the said resin was calculated to be the following:

[(CH₃)₁.₃Si(OC₄H₉)₁.₃₀O₀.₄₅]x where $x$ is an integer greater than 1. The procedure employed was identical with the one used in preparing the methyl butoxypolysiloxane in Example 4. On heat reacting 600 parts of this methyl polysiloxane resin for about 8 hours at from 140° to 200° C. with the oil-modified alkyd resin prepared in Example 2, there was obtained about 68.1 parts n-butanol for each 100 parts of the aforementioned methyl polysiloxane resin. The final reaction product had a 10-second cure on a 200° C. hot plate.

*Example 6*

About 450 parts of a methyl polysiloxane resin containing silicon-bonded butoxy radicals and being represented by the formula

[(CH₃)₁.₃Si(OC₄H₉)₁.₃₅O₀.₆₅]x where $x$ is an integer greater than 1, was reacted with an oil-modified alkyd resin containing residual OH groups prepared in the usual manner as disclosed previously in Example 2. Heating of this mixture of two resins for 6 hours at from about 145° to 161° C. yielded about 58.7 parts n-butanol per 100 parts of the methyl polysiloxane resin, as well as the desired compatible alkyd-polysiloxane resinous product.

*Example 7*

To each of the heat-reacted alkyd-polysiloxane reaction products prepared in Examples 4, 5 and 6 was added sufficient xylene to make a coating composition containing about 60 per cent solids. Each coating composition was applied to a glass slide in the form of a film and the film baked for about 1 hour at 200° C. In each case there was obtained a clear, compatible, hard, chemically-resistant film which was highly resistant to discoloration at elevated temperatures, even for prolonged periods of time.

*Example 8*

Pure dimethyldichlorosilane was hydrolyzed in water and the hydrolysis product separated and about 547 parts of the hydrolyzed product was equilibrated with about 453 parts dimethyldichlorosilane by shaking these two materials together in the presence of a small amount (about 0.5 per cent, by weight) of FeCl₃.6H₂O to yield a polymeric methyl siloxane containing 23 per cent chlorine and comprising essentially a polymeric dimethyl siloxane containing terminal groups corresponding to the formula

This chlorine-terminated polysiloxane was reacted with 529 parts n-butanol to obtain an n-butoxy-silicon-bonded polymeric dimethyl siloxane. Volatile material was stripped off up to a 180° C. pot temperature. This polysiloxane had the following empirical formula:

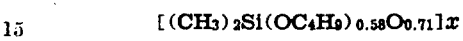
[(CH₃)₂Si(OC₄H₉)₀.₅₈O₀.₇₁]x where $x$ is an integer greater than 1. An oil-modified alkyd resin was prepared by heating 175 parts coconut oil acids, 174 parts phthalic anhydride, and 226.5 parts pentaerythritol in the presence of 50 parts xylene. The methyl n-butoxypolysiloxane and alkyd resin were heat-reacted in the same manner as was done in the foregoing examples to give an alkyd-polysiloxane resinous product which could also be employed for coating compositions.

*Example 9*

In this example is disclosed a modification of an alkyd resin using a liquid methyl polysiloxane containing silicon-bonded alkoxy groups as a modifying ingredient in place of the usual oily modifying ingredients employed in alkyd resin manufacture.

| | Parts | Approximate Molar Ratio |
|---|---|---|
| Phthalic anhydride | 296 | 1 |
| Pentaerythritol | 272 | 1 |
| Liquid methyl polysiloxane containing silicon-bonded n-butoxy radicals (same as one prepared in Ex. 8) | 400 | |
| Xylene | 75 | |

The above mixture of ingredients was heated at its reflux temperature in the same type apparatus as employed in Example 1, and the water and n-butanol formed as a result of the reaction were removed during this reflux period. There were thus obtained about 38.3 (theoretical 42.0 parts) parts n-butanol for every 100 parts of the liquid methyl butoxypolysiloxane, and approximately 36 parts water. The product was a clear resinous material which could be used by itself or cocondensed with other organoalkoxy polysiloxanes to yield compositions useful in coating applications. The product of reaction can also be blended with other resinous products.

It will, of course, be understood by those skilled in the art that modifications of our claimed compositions of matter are within the intended scope of this invention. For instance, other resins such as natural resins, e. g., rosin, shellac, kauri, dammar; coumarone-indene resins; other synthetic resins, for example, phenolic resins, other alkyd resins, etc., and mixtures thereof, may be admixed or chemically combined with the claimed compositions of matter.

In apreparing lacquers from the compositions disclosed previously, various other suitable solvents or mixtures of suitable solvents may be employed which have not been disclosed in the foregoing examples. These include ketones, e. g., methyl cyclo-hexanone, methyl isobutyl ketone, mesityl oxide, methyl n-amyl ketone, di-isobutyl ketone, etc.; esters, e. g., glycol diacetate, butyl lactate, etc.; other coal tar solvents, e. g., tetralin, benzene, etc.; higher alcohols such as butanol, benzyl alcohol, etc.; nitroparaffins, especially those containing from 1 to 5 carbon atoms, e. g., nitromethane, 1-nitropropane, 2-nitropropane, the nitrobutanes, the nitropentanes, etc.; chlorinated hydrocarbons, e. g., carbon tetrachloride, pentachlorethane, ethylene dichloride, etc.; hydrocarbon-substituted ethylene glycol ethers, e. g., ethyl ether of ethylene glycol, butyl ether of ethylene glycol, etc.

It is, of course, understood that the per cent, by weight, of the oil-modified alkyd resin and the organo-polysiloxane containing silicon-bonded alkoxy radicals may be varied widely depending upon the particular use or application intended for the heat-reacted product of reaction. Thus we may use, by weight, from 0.05 to 15 parts or more of the organopolysiloxane containing silicon-bonded alkoxy radicals per part of the oil-modified alkyd resin containing free OH groups. For coating applications, the oil-modified alkyd resin is preferably present in an amount equal to from 5 to 1000 per cent, by weight, based on the weight of the organopolysiloxane in order to give coatings having improved chemical and heat resistance. However, we do not intend to be limited to these proportions since it is evident that higher or lower amounts of the oil-modified alkyd resin may be employed depending upon the particular application and properties desired, without departing from the scope of the invention.

What we claim as new and desire to secure by Letters Patent of the United States is:

1. The process for making a compatible resinous composition which comprises (1) forming a mixture of ingredients comprising (a) a preformed oil-modified alkyd resin containing free residual alcoholic hydroxyl groups, the amount of oil modification in the alkyd resin being from 5 to 80 per cent, and the polyhydric alcohol used in making the alkyd resin being in excess over that required to esterify all the carboxy groups in the alkyd resin-forming reactants, and (b) a preformed organo-polysiloxane consisting essentially of silicon-bonded monovalent hydrocarbon groups, silicon-bonded alkoxy radicals, and silicon and oxygen atoms, and containing from 0.1 to 1.0 silicon-bonded alkoxy radicals per silicon atom and from 0.1 to 2.5 hydrocarbon groups per silicon atom exclusive of the alkyl groups in the alkoxy radicals and (2) heating the mixture obtained in (1) at an elevated temperature while at the same time removing the alkanol formed as a result of the interaction of the alcoholic hydroxyl groups of the alkyd resin and the alkoxy radicals of the organopolysiloxane until an intercondensed homogeneous and compatible resinous product is obtained.

2. The process for making a compatible resinous composition which comprises (1) forming a mixture of ingredients comprising (a) a preformed oil-modified alkyd resin containing free residual alcoholic hydroxyl groups, the amount of oil modification in the alkyd resin being from 5 to 80 per cent, and the polyhydric alcohol used in making the alkyd resin being in excess over that required to esterify all the carboxy groups in the alkyd resin-forming reactants, and (b) a preformed methylpolysiloxane consisting essentially of silicon-bonded methyl groups, silicon-bonded alkoxy radicals, and silicon and oxygen atoms, and containing from 0.1 to 1.0 silicon-bonded alkoxy radicals per silicon atom and from 0.1 to 2.5 methyl groups per silicon atom excluusive of any methyl groups which may be present in the alkoxy radicals, and (2) heating the mixture obtained in (1) at an elevated temperature while at the same time removing the alkanol formed as a result of the interaction of the alcoholic hydroxyl groups of the alkyd resin and the alkoxy radicals of the organopolysiloxane until an intercondensed homogeneous and compatible resinous product is obtained.

3. The process for making a compatible resinous composition which comprises (1) forming a mixture of ingredients comprising (a) a preformed oil-modified alkyd resin containing free residual alcoholic hydroxyl groups, the amount of oil modification in the alkyd resin being from 5 to 80 per cent, and the polyhydric alcohol used in making the alkyd resin being in excess over that required to esterify all the carboxy groups in the alkyd resin-forming reactants, and (b) a preformed organopolysiloxane consisting essentially of silicon-bonded methyl and phenyl groups, silicon-bonded alkoxy radicals, and silicon and oxyqen atoms, and containing from 0.1 to 1.0 silicon-bonded alkoxy radicals per silicon atom and from 0.1 to 2.5 total methyl and phenyl groups per silicon atom exclusive of any methyl groups which may be present in the alkoxy radicals, and (2) heating the mixture obtained in (1) at an elevated temperature while at the same time removing the alkanol formed as a result of the interaction of the alcoholic hydroxyl groups of the alkyd resin and the alkoxy radicals of the methyl phenyl polysiloxane until an intercondensed homogeneous and compatible resinous product is obtained.

4. The process for making a compatible resinous composition which comprises (1) forming a mixture of ingredients comprising (a) a preformed oil-modified alkyd resin containing free residual alcoholic hydroxyl groups, the amount of oil modification in the alkyd resin being from 5 to 80 per cent, and the polyhydric alcohol used in making the alkyd resin being in excess over that required to esterify all the carboxy groups in the alkyd resin-forming reactants, and (b) a preformed methyl polysiloxane consisting essentially of silicon-bonded methyl groups, silicon-bonded butoxy radicals, and silicon and oxygen atoms, and containing from 0.1 to 1.0 silicon-bonded butoxy radicals per silicon atom and from 0.1 to 2.5 methyl groups per silicon atom, and (2) heating the mixture obtained in (1) at an elevated temperature while at the same time removing the butanol formed as a result of the interaction of the alcoholic hydroxyl groups of the alkyd resin and the butoxy radicals of the methyl polysiloxane until an intercondensed homogeneous and compatible resinous product is obtained.

5. The process for making a compatible resinous composition which comprises (1) forming a mixture of ingredients comprising (a) a preformed oil-modified glyceryl-phthalate alkyd resin containing free residual alcoholic hydroxyl groups, the amount of oil modification in the said alkyd resin being from 5 to 80 per cent, and the glycerine used in making the alkyd resin being in excess over that required to esterify all the carboxy groups in the alkyd resin-forming reactants, and (b) a preformed methyl phenyl polysiloxane consisting essentially of silicon-bonded methyl and phenyl groups, silicon-bonded butoxy radicals, and silicon and oxygen atoms, and containing from 0.1 to 1.0 silicon-bonded butoxy radicals per silicon atom and from 0.1 to 2.5 total methyl and phenyl groups per silicon atom, and (2) heating the mixture obtained in (1) at an elevated temperature while at the same time removing the butanol formed as a result of the interaction of the hydroxyl groups of the alkyd resin and the butoxy radicals of the methyl phenyl polysiloxane until an intercondensed homogeneous and compatible resinous product is obtained.

6. The process for making a compatible resinous composition which comprises (1) forming a mixture of ingredients comprising (a) a preformed oil-modified glyceryl-phthalate alkyd resin containing free residual alcoholic hydroxyl groups, the amount of oil modification in the said alkyd resin being from 5 to 80 per cent, and the glycerine used in making the alkyd resin being in excess over that required to esterify all the carboxy groups in the alkyd resin-forming reactants, and (b) a preformed methyl polysiloxane consisting essentially of silicon-bonded methyl groups, silicon-bonded butoxy radicals, and silicon and oxygen atoms, and containing from 0.1 to 1.0 silicon-bonded butoxy radicals per silicon atom and from 0.1 to 2.5 methyl groups per silicon atom, and (2) heating the mixture obtained in (1) at an elevated temperature while at the same time removing the butanol formed as a result of the interaction of the hydroxyl groups of the alkyd resin and the butoxy groups of the methyl phenyl polysiloxane until an intercondensed homogeneous and compatible resinous product is obtained.

7. An intercondensed homogeneous and compatible resinous product obtained by the process described in claim 2.

8. An intercondensed homogeneous and compatible resinous product obtained in accordance with the process described in claim 4.

9. An intercondensed homogeneous and compatible resinous product obtained in accordance with the process described in claim 6.

CHARLES D. DOYLE.
HENRY C. NELSON, Jr.

REFERENCES CITED

The following references are of record in the file of this patent:

UNITED STATES PATENTS

| Number | Name | Date |
|---|---|---|
| 2,386,793 | Hanford | Oct. 6, 1945 |
| 2,395,550 | Iler et al. | Feb. 26, 1946 |
| 2,529,956 | Myles et al. | Nov. 14, 1950 |

FOREIGN PATENTS

| Number | Country | Date |
|---|---|---|
| 583,754 | Great Britain | Dec. 30, 1946 |